W. M. KELLY.
TYPE DISTRIBUTING MACHINE.
APPLICATION FILED FEB. 1, 1912.

1,097,331.

Patented May 19, 1914.
10 SHEETS—SHEET 2.

Fig. 2

Witnesses
Frank H. Vick Jr.
T. O. MacKinnon

Inventor
Wm. M. Kelly
By F. Amos Johnson
Att'y

W. M. KELLY.
TYPE DISTRIBUTING MACHINE.
APPLICATION FILED FEB. 1, 1912.

1,097,331.

Patented May 19, 1914.
10 SHEETS—SHEET 3.

Fig. 3

W. M. KELLY.
TYPE DISTRIBUTING MACHINE.
APPLICATION FILED FEB. 1, 1912.

1,097,331.

Patented May 19, 1914.
10 SHEETS—SHEET 5.

Witnesses
Frank H Wick Jr.
T. C. MacKinnon

Inventor
Wm. M. Kelly
By F. Amos Johnson
Atty.

W. M. KELLY.
TYPE DISTRIBUTING MACHINE.
APPLICATION FILED FEB. 1, 1912.

1,097,331.

Patented May 19, 1914.
10 SHEETS—SHEET 8.

W. M. KELLY.
TYPE DISTRIBUTING MACHINE.
APPLICATION FILED FEB. 1, 1912.

1,097,331.

Patented May 19, 1914.
10 SHEETS—SHEET 9.

Witnesses
Frank H. Vick Jr.
T. O. MacKinnon

Inventor
Wm. M. Kelly
By F. Amos Johnson
Att'y.

W. M. KELLY.
TYPE DISTRIBUTING MACHINE.
APPLICATION FILED FEB. 1, 1912.

1,097,331.

Patented May 19, 1914.
10 SHEETS—SHEET 10.

Witnesses
Frank H. Wick Jr.
T. O. MacKinnon

Inventor
Wm. M. Kelly,
By F. Amos Johnson
Att'y.

UNITED STATES PATENT OFFICE.

WILLIAM M. KELLY, OF BROOKLYN, NEW YORK.

TYPE-DISTRIBUTING MACHINE.

1,097,331.  Specification of Letters Patent.  Patented May 19, 1914.

Application filed February 1, 1912. Serial No. 674,679.

*To all whom it may concern:*

Be it known that I, WILLIAM M. KELLY, a citizen of the United States, and a resident of Brooklyn, in the county of Kings, in the State of New York, have invented certain new and useful Improvements in Type-Distributing Machines, of which the following is a specification.

My invention relates to that class of type distributing machines which has individual carriers. These carriers are each provided with a distributing index which is set to correspond to the distributing nicks of the type and they call into action a discharging mechanism which deposits the type in its proper channel of the magazine, as the carrier reaches that point.

My improvements relate to the form of carrier; its gripping, discharging and indexing members; to the mechanism for cutting off type from a continuous line; to setting the distributing index according to the distributing nicks of the type and loading the type into the carriers; to a device for reading the index and discharging the type at the proper time.

Other improvements will be pointed out in the description and defined in the claims which follow.

General description.

The individual carriers are channel-shaped and each carrier is provided with a gripping spring which is raised to receive a type; with a discharging plunger which recedes as the type is loaded into the carrier, causing the end opposite the type to extend beyond the carrier and against which the ejecting mechanism acts to push the type from the carrier, and with a series of friction held pins which constitute the distributing index referred to. These carriers are mounted on an endless chain and the chain is supported on a suitable upright which is slightly inclined, although substantially in an upright position. The chain is mounted so that the carriers move down the front side of the upright and up the back—the chain encircling the upright. This general arrangement requires the minimum amount of floor space and permits of easy access to all the parts.

The dead matter to be distributed is placed in a galley at the upper left hand side and the lines are automatically fed forward and then carried to the right, the type at the right hand end being cut off and loaded into the carrier which is opposite it at the time—the chain having a step by step movement with each revolution of the drive shaft. The distributing index pins are set in the carriers by a mechanism which will be pointed out in the detail description.

As each carrier reaches the loading position where it is to receive a type the gripping spring is raised to permit the type to enter the carrier; then it is allowed to grip or hold the type until the type is positively forced from under the spring. Each carrier, then, after passing the loading position has a type, spring-held or gripped in its left end, which rests against the end of an ejecting plunger carried by the carrier and also has the distributing index pins referred to set (projected forward) in proper combination to correspond to the distributing nicks of that type.

In front of the chain of carriers there is mounted a series of gates which are warded to correspond to the nicks of the type and each one of which represents a different character or combination. There would, therefore, be as many of these warded gates as there are different characters to be distributed. These gates swing on a horizontal axis and each one controls the free end of an ejecting finger. These fingers are mounted on a vertical bar in front of the upright, at the right of the carriers and they are reciprocated left and right with every revolution of the drive shaft. The left or free ends of the fingers are adapted to strike against the projecting ends of the discharging plungers of the carriers and to force the type from the carriers. This action takes place when the setting of the index pins of any carrier corresponds to the wards of a gate—that is, when a type reaches a position opposite the gate for which its combination was set. In all other positions it swings the gates aside carrying the free end of the ejecting fingers out of register with the ejecting plungers of the carriers, and the type are carried by without being discharged. At the left of the chain of carriers there is a series of shelves—one for each different character to be distributed and corresponding to the series of gates—onto which the discharged type are pushed. I have also shown the magazine of a type setting machine which is adapted to register with these shelves and into the channels of which the type are delivered.

The drive shaft which carries the cams, etc., from which the movements necessary to produce the different operations are generated, is located on the back of the upright near the top. With each revolution of the drive shaft all the necessary movements are produced to cut off a type, read its nicks and set the combinations in the carriers, load it into the carrier, to advance the chain of carriers one step and to eject all type which are in register with their proper or "home" shelves.

*Detail description.*

Reference is made to the accompanying sheets of drawings in which—

Fig. 13 is a perspective view of detached parts showing connection between the type and the combination index; Fig. 13$^a$ is a partial horizontal section about on line G—G of Fig. 9; Fig. 21 is a partial front elevation of the galley, showing the means of stopping the feeding mechanism.

Figure 3:
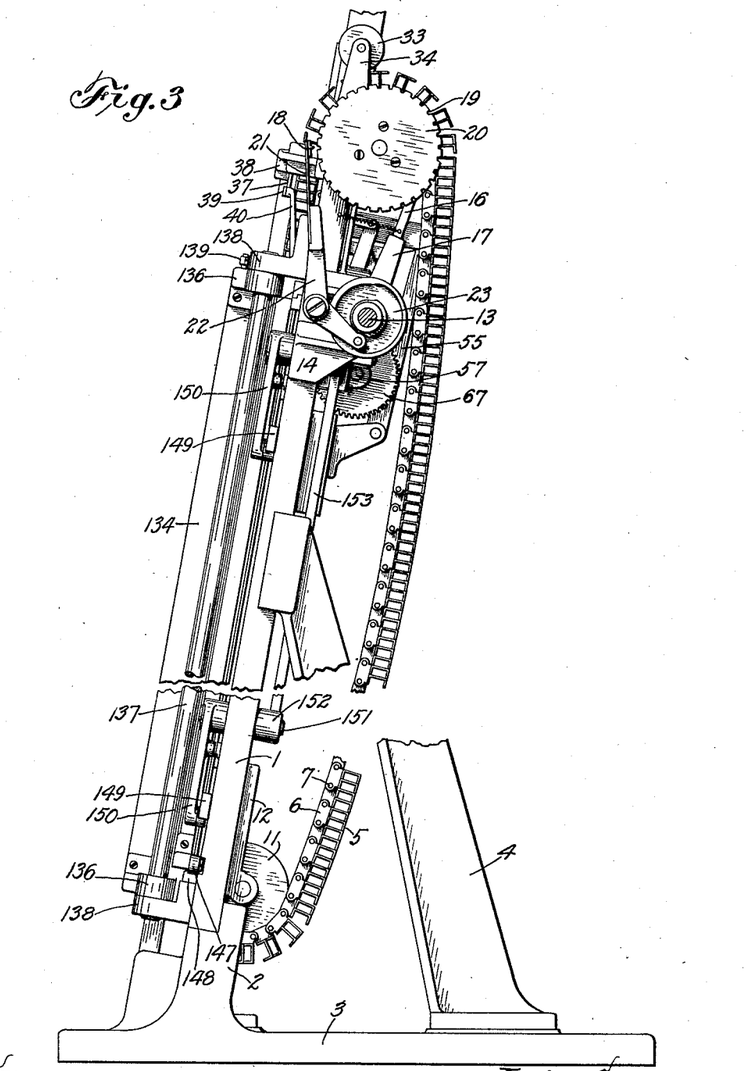
Fig. 3 is a right elevation.
Figure 4:
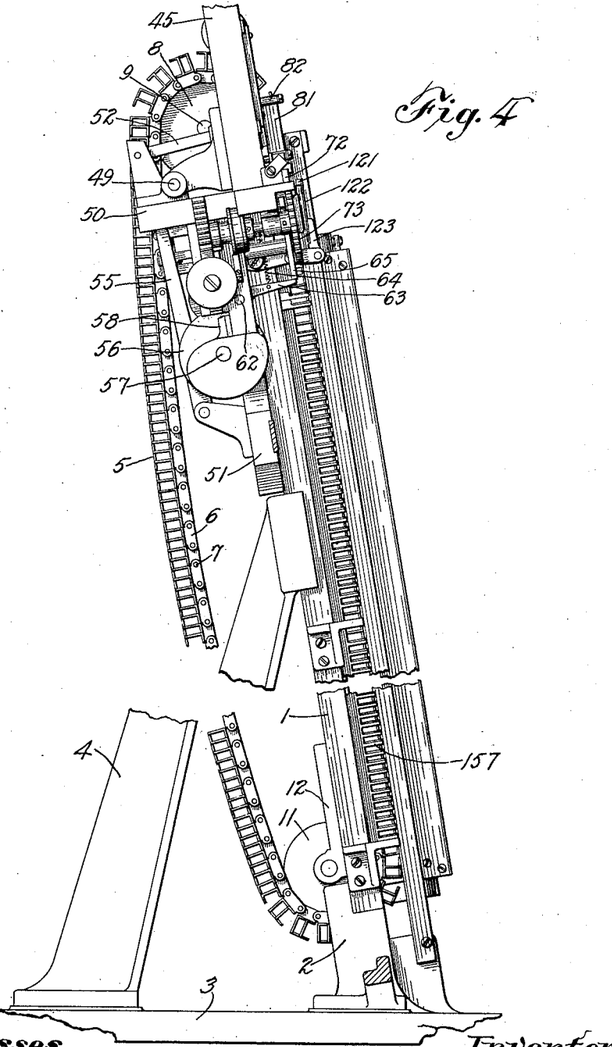
Fig. 4 is a left elevation.
Figure 5:
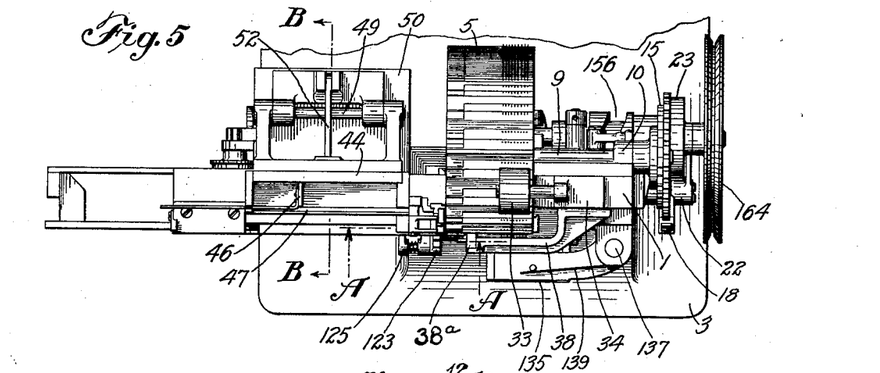
Fig. 5 is a plan.

The upright 1, already referred to, is secured to a projection 2 of a base 3 and is supported by a pair of braces 4, at the rear. Encircling this upright, as shown in Figs. 3 and 4, there is a series of channel-shaped type carriers 5 which are attached to links 6 of the chain proper—the links being connected by hinge pins 7. The chain is supported at the top by a pair of sprocket wheels 8 which is carried on the left end of a shaft 9—said shaft being mounted in a bearing bracket 10 on the rear of the upright at the top. At the bottom the chain passes around an idler 11, which is mounted on the upright by a bracket 12. The chain links 6 are also channel-shaped and the bent over portions 6$^a$ have perforations 6$^b$ to receive the hinge pins 7. These pins are slightly shorter than the width of the outside links and by making a dent 6$^c$ in these outside links the pins are held in place. It will be noticed that the chain links are in pairs—half of them having their bent-over portions 6$^a$ outside of and inclosing the corresponding parts of the other half. The power shaft 13 is mounted on the rear side of the upright, near its top, in boxes 14.

The chain shaft 9 has at its right hand end a ratchet wheel 15, the teeth of which are engaged by a pawl 16 which is carried by an eccentric strap 17 on the power shaft and by means of which the shaft 9 is turned one tooth or step with each revolution of the power shaft.

The chain is locked in each position to which the pawl 16 feeds it, by a locking tooth 18 which is adapted to enter one of the teeth 19 of an indexed wheel 20 which is carried by the shaft 9. The tooth 18 is carried by a stiff spring 21 which is fastened to the upper arm of a lever 22—the movements of the lever to lock the wheel 20 being controlled by a cam 23 on the power shaft 13 as shown in Fig. 3.

The exact construction of the carriers is shown in Figs. 14–17. These are composed of channel-shaped pieces 5 as already stated. One side of each carrier is attached by screws 24 to the chain links 6. As shown each of the links 6 has two carriers fastened to it.

The carriers are accurately positioned on the links 6 by a pair of dowels 6$^d$ which are adapted to enter holes 24$^a$ of the carriers. These dowels are formed by partially punching out metal from the links 6 which makes a cheap and very accurate construction. The carriers are made of such size that when assembled on the chain they are very close together but still do not touch one another. This construction makes it possible to manufacture these parts completely formed in a punch press.

Figure 14:
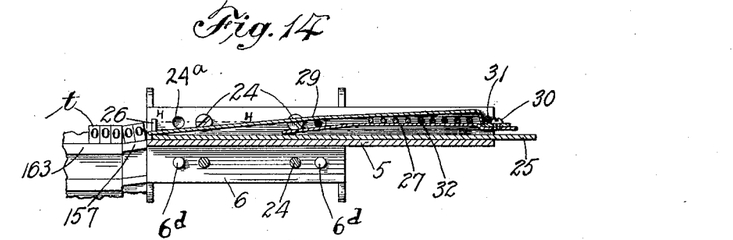
Fig. 14 is a longitudinal section of a carrier on line D—D of Fig. 15.
Figure 15:
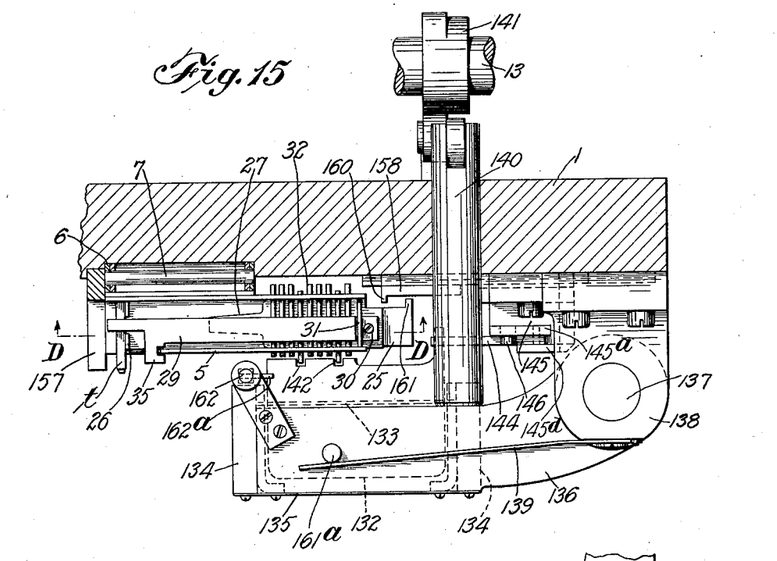
Fig. 15 is a horizontal section showing a carrier in plan, about on line E—E of Fig. 1.
Figure 16:
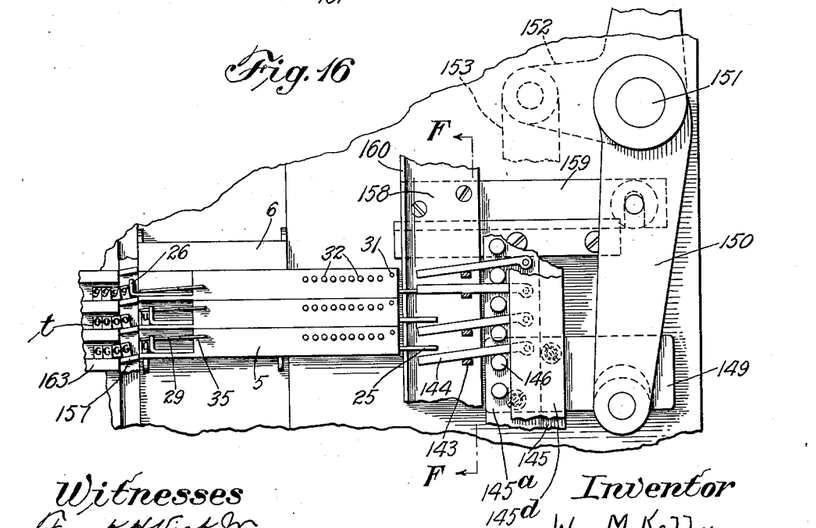
Fig. 16 is a full size front elevation of a portion of the carriers and ejecting mechanism.

A portion of the front side of each carrier is cut away as shown in Figs. 15 and 16 to make room for the type $t$ which extends forward beyond the carrier. Resting on the bottom portion of the carrier and sliding between the side walls of the same is a discharging plunger 25, having an upturned end 26 which comes in contact with the type. This plunger is friction-held by the free end of a bridge piece 27 which is held in grooves 28 in the side walls of the carrier. The spring 29 also bears against the plunger when there is no type in a carrier and gives an additional friction to the plunger. A gripping spring 29 is secured by screw 30 to the bridge piece and a locking pin 31 holds the bridge and gripping spring in place. The upturned end 26 of the discharging plunger is notched as shown in Fig. 14 so that the gripping spring may hold a type of minimum size body, while the end 26 will push a type of maximum size body without any tendency to turn it over. Extending between the side walls of the carrier there is a series of pins 32 which constitute the distributing index already referred to. These bear against the bridge piece 27 which causes sufficient friction to hold them in place. These distributing index pins have a transverse movement in the carriers. They are driven forward at the point where the type are loaded into the carrier as will be explained farther on and all of the pins which are driven are returned to their normal or unset position by a roll 33 which is mounted by a bracket 34 on the top of the upright and under which the pins of all the carriers must pass on their way to the loading position.

The gripping springs 29 each have a projection 35, by means of which the springs are raised to receive a type. This is accomplished by a pin 36, which is carried by the free end of an arm 37 which is pivoted to a bracket 38—said bracket being attached to the upright, on its front side, near its top. The pin is located so that when swung to the left it will be in the path of the projections 35 of the springs, and as each carrier is brought into loading position by movement of the chain its spring is caught by the pin 36 and raised to permit a type to enter the carrier. The spring is then lowered onto the type by a swinging movement of the arm 37. This movement, being a swinging movement, lets the spring onto the type gently so there is no danger of breaking a very thin character. The movements of the arm 37 and hence the position of the pin 36 are controlled from the power shaft through the following parts: connecting links 39, arm 40, shaft 41 which extends through the upright to the back side, arm 42 and cam 43 which is on the shaft 13.

A bar 38ª, which is secured at the top to the bracket 38 and at the bottom to the portion 2 of the base, holds the carriers and chain back against the upright—these parts having a running clearance only between said bar and the upright.

The construction of the carriers and chain is of very great importance. All the machines of this type heretofore made, so far as I am aware—that is, machines with a large number of individual type carriers— have been of such design that they required very accurate milling, grinding or machining which makes them expensive machines to build. By my improved design all these parts except the hinge pins of the chain and the screws are the product of the punch press—the sheet metal out of which they are formed being blanked out, perforated and bent into shape with great rapidity and a constant, uniform accuracy. Moreover, the construction is such that, without change of adjustment, the carriers will hold any size of type from the smallest to the largest size for which the machine is built. I am, therefore, with one machine of cheap and simple construction, able to handle a range of type which has hitherto required several machines of expensive construction.

Figure 1:
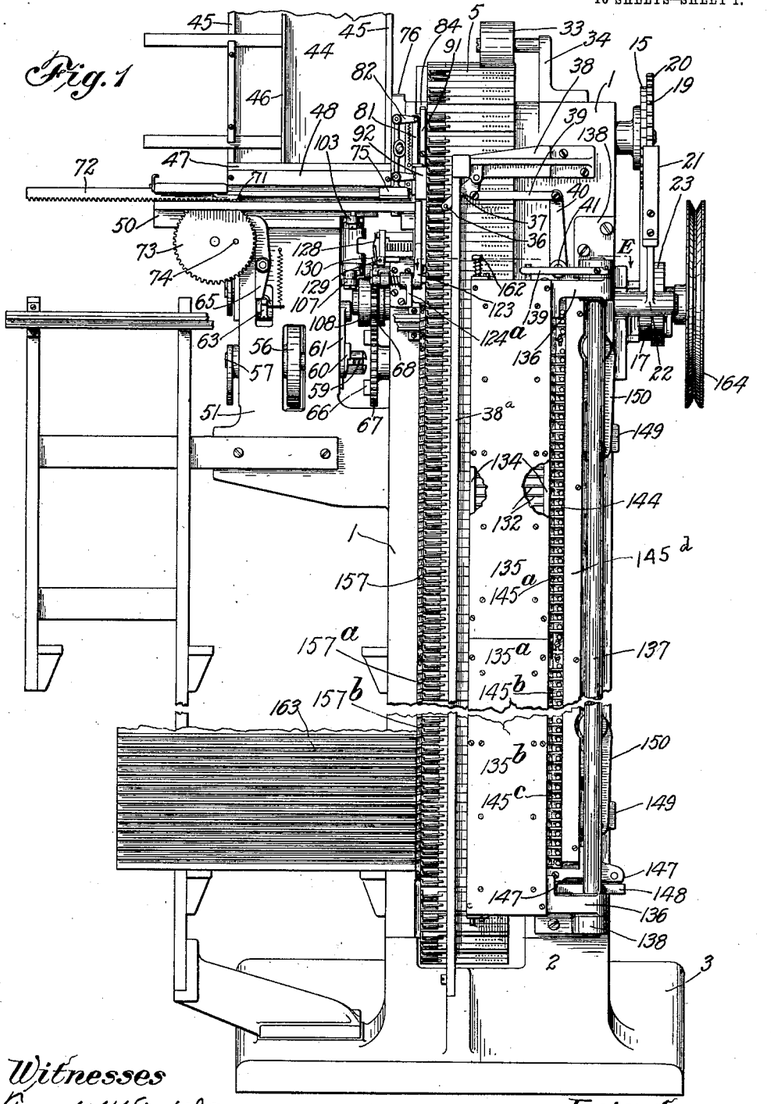
Figure 1 is a front elevation.
Figures 7, 8:
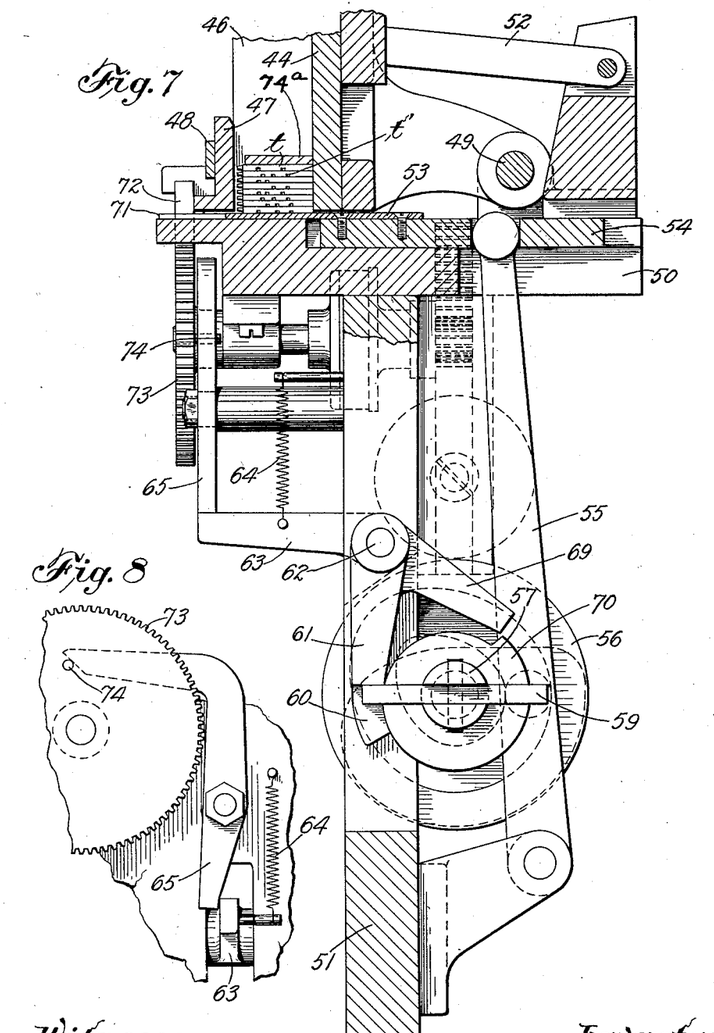
Fig. 7 is a section on line B—B of Figs. 2 and 5.
Fig. 8 is an enlarged view of a portion of Fig. 1.

The dead matter to be distributed is placed in a suitable galley composed of back plate 44 and sides 45. This galley is provided with an adjustable side stick 46 and an adjustable guard 47 which is held by a clamping bar 48 (Figs. 1 and 7). The galley is suitably hinged by pin 49 to a base plate 50, which is supported by an L-shaped bracket 51 which extends to the left from the upright. A latch 52 holds the galley in a forward upright position. It is evident from this construction that the galley may be put in a horizontal position, if desired, while receiving the dead matter. The lines of type are fed forward by a line ejecting blade 53, which is attached to a slide 54, which is mounted in the base plate 50. The movements of the slide are controlled by a lever 55 which is actuated by a cam 56— said cam being carried by an intermittently running shaft 57. The shaft 57 is mounted in boxes 58 on the rear side of the bracket 51 and is driven, when called into action, by a clutch pawl 59. This pawl is normally held out of operative position by a stop-wedge 60 which is on the lower end of an arm 61 which is mounted on a shaft 62, journaled in bracket 51. This shaft has on its left end a horizontal arm 63 which tends to move upward by a spring 64 but which is normally held down by latch 65. On releasing the latch the spring 64, through the parts just pointed out, will withdraw the wedge 60, thus permitting a spring (not shown) to throw the rear end of clutch pawl 59 into engagement with one of the clutch teeth 66 which are carried by a gear 67— said gear being in mesh with a gear 68 which is on the power shaft. The gear 67 has twice the number of teeth as the gear 68 and there are two clutch teeth 66. The shaft 57 will, therefore, always be called into action at the same portion of the revolution of the power shaft and will be turned at one-half the speed—it being found desirable to operate the line ejecting mechanism at a slower rate of speed and to have its movement always commence at the same portion of the revolution of the power shaft. The stop-wedge is thrown into position to intercept the pawl 59 by an arm 69 engaging a cam 70 of the shaft 57, and is held there by the latch 65, as already explained.

Figures 13, 13A, 21:
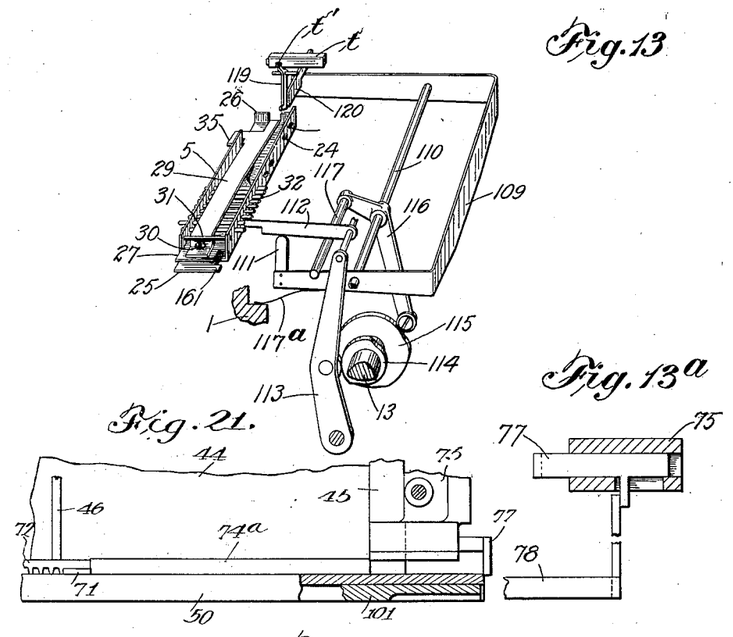

The line of type after being fed forward by the ejector blade 53 is carried to the right by a follower 71, which is carried by a rack 72. This rack is urged to the right by a pinion or gear 73 which is spring controlled. The line of type is, therefore, yieldingly forced to the right where the end type are successively cut off and loaded into the carriers. When the last type of the line has been removed a pin 74 in the gear 73 strikes the end of latch 65 thereby releasing the clutch pawl and permitting the shaft 57 to make one revolution. The cams on this shaft operating through the parts pointed out and other mechanism which is shown in the drawings but which it is not necessary to identify by reference numbers, cause the follower 71 to be withdrawn, a new line to be ejected and the follower permitted to carry it to the right in the same manner as for the preceding line. In order to prevent this movement being repeated over and over again when all the lines of dead matter have been removed from the galley, I provide a stop slug 74$^a$ which is put into the galley on the top of the uppermost line. The guard 47 is set so that the type have an excessive clearance—sufficient to take in the stop slug 74$^a$ which is thicker than the body of the type which is being distributed. The bracket 75 under which the type must pass, as will be explained, has a close running clearance for the type. It is evident that when all the type has been distributed the stop slug will be fed out and will be caught by the bracket 75 as shown in Fig. 21 and that no further movement of the rack 72 will be permitted.

The mechanism for separating and cutting off the type from the line works on the well known principle of placing the type under side pressure and advancing the line slowly. As soon as the first type reaches a point where it is free to be moved sidewise it is cut off from the line and the advance of the line stopped. I have made improvements in the specific mechanism which permits easy adjustment to various body sizes of type, which support a thin type and prevent its turning while being carried on after it is cut off and I have provided a construction which makes the parts easily accessible.

Figure 6:
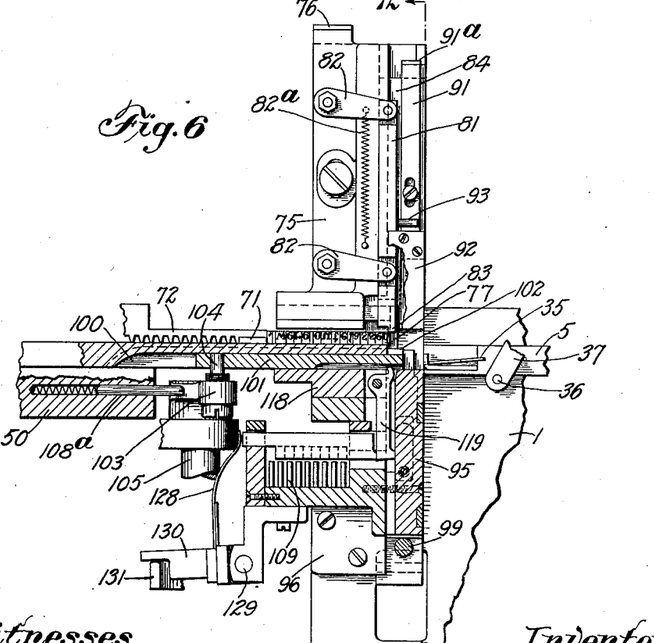
Fig. 6 is a section on line A—A of Fig. 5.

As the line is moved to the right on the base 50 by the rack 72 the type pass under an adjustable bracket 75. This bracket has on its upper end, a clip 76 which extends over the top of the upright. By placing a type under this clip the bracket is adjusted to a height which will allow type of the same body size to move freely between the bracket and the base 50. Suitably mounted to slide in the bottom of the bracket 75 is a type hook 77. This hook engages the end type of the line and its movements are controlled by a sliding bar 78 which is mounted on the rear side of the upright (Fig. 13$^a$) the movements of the sliding bar being controlled by a cam 79 through a bell crank cam lever 80. The connection between the hook and bar is by contact, so that the hook may be adjusted up and down with the bracket 75 for various body sizes of type and still be controlled by the bar 78. A cut-off bar 81 is pivoted by upper and lower pairs of arms 82 to the bracket 75 as shown in Fig. 6. A spring 82$^a$ urges the bar downward. This bar has on its lower end a projection 83. The left edge of this projection is slightly to the right of but almost in line with the right hand edge of the base 50. Attention is called to the manner in which the cut-off bar is mounted. The parallel ruler movement of the bar 81 virtually eliminates all friction and leaves the bar free to cut off a type, under action of its spring 82$^a$.

At the right of the bracket 75 there is a vertical transfer slide 84 the upward movement of which is controlled by a cam 85 and arm 86 and the downward movement by cam 87 and arm 88 both of their arms being attached to a short shaft 89 which is carried by the left hand box 14 of the power shaft. Connection between the arm 86 and slide 84 is made by a spring 90 for safety.

The slide 84 which is called into action to transfer the type from where they are cut off to loading position has an adjustable member 91 which is provided with front and rear plates 92. These plates project slightly to the left so as to inclose the cut-off bar 81. The part 91 has a clip 91$^a$ on its upper end which extends over the top of the transfer slide 84 and a type placed under this clip will adjust the transfer plates 92 to the proper setting for a corresponding size of type body. The cut off bar 81 has a pin 93 which rests on a shoulder 94 of the part 91. Below the part 91 and about in line therewith there is a block 95. This block is attached to a bracket 96, which is secured to the upright, and on its front and rear edges there are mounted vertical slides 97 which are friction held by springs 98.

Figures 9, 10, 11, 12:
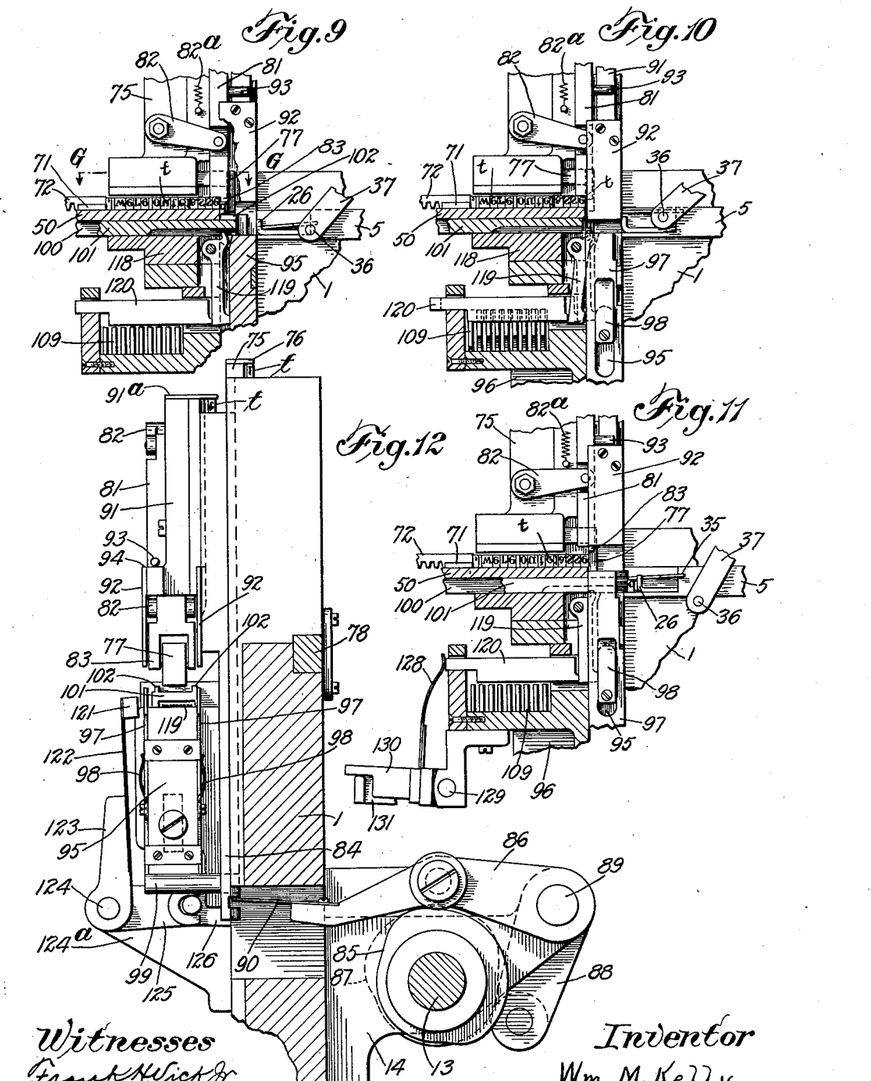
Figs. 9, 10 and 11 are front, sectional elevations, about on line A—A of Fig. 5.
Fig. 12 is a right elevation of parts shown in Fig. 6.

When the machine is running the type hook is moved to its extreme left hand position and the transfer slide 84 is raised to its highest position (as shown in Fig. 11). This raises the cut off bar 81 so that its toe 83 clears the line of type. The type hook is permitted to move to the right about the width of the thinnest character and the transfer slide is lowered sufficiently to permit the spring 82$^a$ to force the cut off bar against the end type. The type hook is then permitted to be moved slowly to the right by the line rack 72. As soon as the end type has advanced far enough to the right to clear the end of base 50 the cut off bar acts to move the type downward slightly (see Fig. 9) until it almost reaches the upper ends of the friction slides 97. These slides were raised by a pin 99 which extends forward from the transfer slide 84, on the upward movement of said slide and they do not reach quite to the upper surface of the base 50; but are far enough below that surface to permit a short free movement necessary to cut off a type, as already explained. As a type is carried downward by the plates 92, the friction plates are pushed downward by the type and the type is thus held from turning and prevented from moving except in the direction in which the cut-off slides are carrying it.

In a groove 100 on the under side of base plate 50 there is mounted a loading plunger 101. This plunger has on its upper surface a pair of ribs 102 on which the type rest when first cut off—the cams being so timed that the plunger is left projecting for this purpose. After the type or cut off the plunger is withdrawn and the transfer slide is moved downward, the type carrying the friction slides 97 with it, which prevents a thin type from turning or falling over and the type is left on top of the block 95, in front of the loading plunger 101 and directly in line with one of the carriers. The plunger is then forced to the right and the type deposited in one of the carriers and the gripping spring allowed to drop into it as shown in Fig. 11. The movement of the loading plunger is effected by means of a lever or arm 103 which has a pin 104 which enters the plunger. This arm is attached to a short vertical shaft 105 which has on its bottom end a short arm 106 the free end of which has a roll 107 which rests against a cam 108 on the extreme left end of the power shaft. The loading lever is moved to the right to load a type into a carrier by a spring-seated plunger 108$^a$ in the base 50. The cam 108 acts to positively withdraw the loading plunger to the left.

*Combination index setting mechanism.—* A general idea of this mechanism may be had from Fig. 13. There is a series of bail shaped levers 109 which turn on a fulcrum rod 110—one lever for each pin of the index. The right hand end of each of these levers has a post 111 which supports an interponent 112 which is pivoted to the upper end of a cam lever 113. This lever is vibrated by means of cam 114. The forward ends of the levers 109 are drawn downward by action of a cam 115 which acts through a cam lever 116 (fulcrumed on rod 110) which has a rod 117 extending across all the levers 109 and springs 117$^a$ extending out from the upright, are put under tension. In this position the free ends of the interponents pass below the combination index pins 32 of the carriers. At the proper time the cam 115 permits the spring 117$^a$ to act and the levers 109 which are not blocked will be raised causing their interponents to register with corresponding combination index pins and then the lever 113 is forced forward driving those pins in the carrier. The blocking of the levers 109 is controlled by the nicks $t'$ in the type. Pivoted in a block 118 which is mounted in the bracket 96 there are a series of feeler levers or feelers 119, and the lower or pendent end of each of these feelers rests against a horizontal blocking slide 120. These slides vary in length and the left hand end of the levers 109 vary in length so that each slide controls a lever and is adapted to block it on being moved slightly to the left. As shown, there may be nine possible combination nicks in a type which correspond to the positions of the nine feelers. (See Fig. 22.)

Just as a type is cut off and while resting in the ribs 102 of a loading plunger it is forced backward by a yielding type knocker 121 which is carried on the upper end of a spring 122. This spring is attached to an arm 123 which is carried by a shaft 124, (mounted in bracket 124$^a$) which has on its left end a short slotted arm 125 which is actuated by a cam lever 126 and cam 127. The knocker forces the type and spaces back so that their nicks will register with the feelers. As the transfer movement is completed, the type which is cut off lands on the upper ends of the feelers. Where there are nicks in the type the feelers enter them and their slides are not moved; but where there are no nicks in the type the slides are forced over as shown in Fig. 10 and the corresponding levers 109 are blocked. It is evident, then, that the combination index pins will be driven corresponding to the nicks in the type.

The slides are carried to the right and the feelers set or returned to normal position at the proper time by means of springs 128, shaft 129, arm 130, cam lever 131, cam 131$^a$. This indirect connection through the feelers and slides is a great improvement over setting the combinations from the type direct. These parts are very light; the feeler levers are multiplied so that the type require only a very shallow nick and still a lever which is blocked is firmly held with no strain whatever on the type and the lever which is free has ample movement to set its interponent fully and firmly in position to drive the pin in the carrier.

The type is fully transferred before the springs 128 are called into action. This prevents the slides from "dancing"—they go accurately and firmly to place and stay there until released. After the combination pins have been set the pressure of the springs 128 is removed, so there is no pressure of the feelers against the type as it is loaded into the carriers. The weakening of the type by nicking and the wear of the type by distributing is, therefore, reduced to a minimum.

Figure 17:
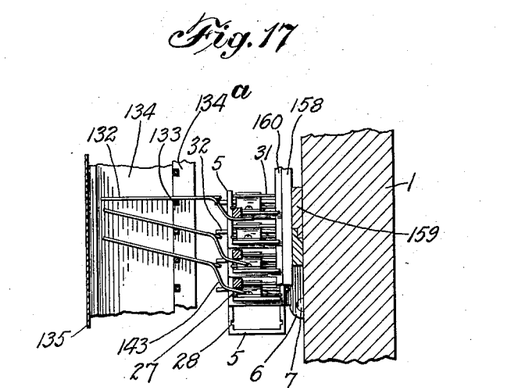
Fig. 17 is a right sectional elevation about on line F—F of Fig. 16.
Figure 18:
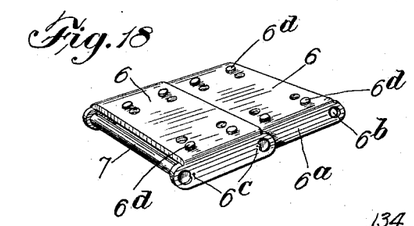
Fig. 18 is a perspective view showing two of the links of the chain.

*Type ejecting or discharging mechanism.—*
In front of the carriers on the front side of the upright and in line with the distributing index pins there is a series of gates 132 which have horizontal hinge pins 133 which turn in right and left side pieces of the gate housing which is formed by the side walls 134 and cover plates 135, 135$^a$ and 135$^b$—the hinge pin being actually held by notched bars 134$^a$ which are secured to the side pieces 134, one of which is shown in Fig. 17. The gate housing is supported by upper and lower arms 136 which are attached to a vertical shaft 137—said shaft being supported by upper and lower hanger brackets 138 close to the right hand edge of the upright. A spring 139 mounted on the upper right hanger 138 tends to carry the gate housing backward against a plunger 140 (Fig. 15). This plunger which slides in the upright is controlled by a cam 141, by means of which the gates are given a slight oscillating movement. The object of this movement is to free the gates which have been rocked by the distributing index pins of the carriers and allow the gates to recover to normal position.

The gates are provided with wards 142, which correspond to the positions of the distributing index pins 32. These wards vary in number and location to effect different combinations. Each of the gates is provided with a projecting toe 143 which supports the free end of an ejecting finger 144. These fingers are pivoted to a vertical bar 145 and are limited in their movement by pins 146. These ejecting fingers are attached to the bar 145 in three sections—the fingers being actually pivoted to three adjustable pieces 145$^a$, 145$^b$ and 145$^c$ carried by said bar and held in position by a keeper plate 145$^d$. The object of this construction will be presently stated.

Figure 2:
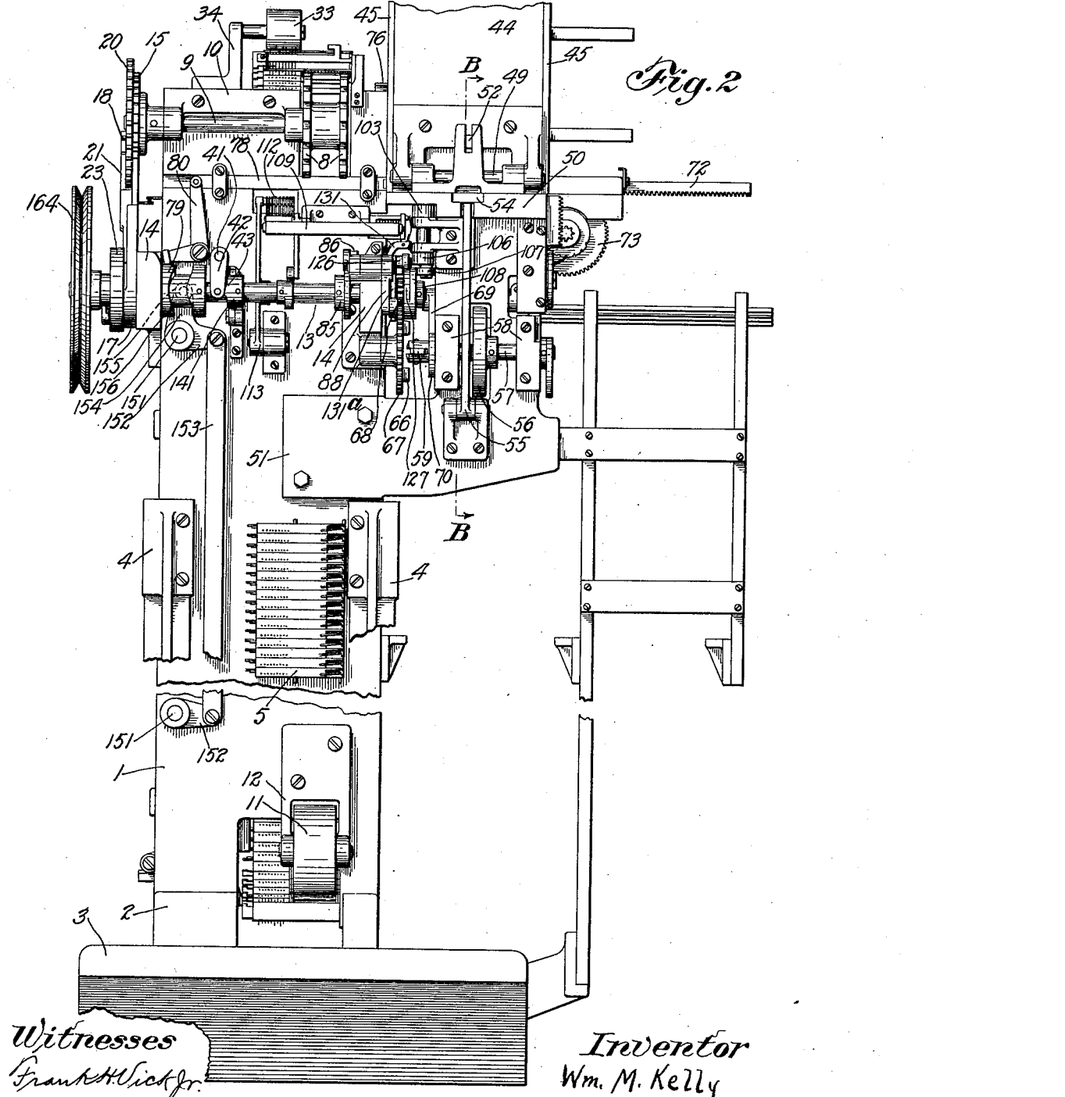
Fig. 2 is a rear elevation.

The bar 145 is supported at its lower end by rolls 147 on a trackway 148 and is connected by links 149 to a pair of vertical arms 150. These arms are connected by shafts 151 to a pair of horizontal arms 152 on the rear side of the upright—the two horizontal arms are joined by a link 153. An arm 154 has a roll 155 (shown in dotted position in Fig. 2) which engages a cam slot 156 of the power shaft. This cam through the connections just pointed out, causes the bar 145 to have a vibrating movement left to right.

The hinge pins of the gates are located back of the center of the gates. The front end of each gate is, therefore, heavier and acts to support one of the ejectors 144.

The discharging plungers 25 extend to the right of the carriers as clearly shown in Figs. 14, 15 and 16. When the gates are in their normal position the ejectors are in line with the discharging plungers; but when the gates are swung out of their normal position, as happens when the wards of the gates do not correspond to the distributing pins which have been driven, the ejectors pass below the ends of the discharging plungers. It will thus be seen that when the distributing index pins of any carrier come to a gate which has wards cut to correspond to that combination, the discharging plunger of that carrier will be operated and the type which is in that carrier will be expelled.

To receive the type after being pushed from the carriers I have provided a series of shelves 157, 157$^a$ and 157$^b$ (see Figs. 1 and 16). These are slightly inclined toward the left so that the end type tends to lean against the type already delivered. The discharging plungers deliver the type well into the shelves, as shown in Fig. 16, and have to be withdrawn before the chain of carriers can be advanced. This is accomplished by a retracting bar 158 which is connected by two links 159 to the swinging arms 150. This retracting bar has a flange 160 which engages a hook 161 of the discharging plungers. The retracting bar, being connected to the same arms that carry the ejectors, the flange 160 gets out of the way of any of the discharging plungers that may be driven and yet insures their withdrawal from the shelves on the return movement of the ejector bar. The gripper springs 29 act as a retaining pawl to prevent a type sticking to the end of the ejecting plunger and being drawn back into the carrier.

The type shelves are made in three sections to permit of a slight adjustment to compensate for a limited amount of wear or stretching of the chain. It will be noticed that the loading position is near the top, close up to the line of the chain shaft 9 so that when one of the carriers is made to register properly at this point by the setting of the index wheel 20, all the other carriers will also register properly and the registering at this point will be little affected by wear or stretching of the chain. By making the type shelves, the gates and the ejecting fingers in sections (three shown as already stated) each section may be adjusted with reference to the chain and as there is a wide range permissible in the register of the carriers with the shelves, as long as the carriers are above the shelves, the chain can be used until badly worn before it becomes useless. To permit of ready accessibility of these parts the spring 139 is raised off its pin 161$^a$ and the whole gate housing with the gates may be swung around on the shaft 137. To enable the gates to pick up the ejectors, on returning to working position I provide a depressor bar 162 which is mounted on the gate housing and which has pins 162ª extending out over the gates. By pushing down on this bar all the toes 143 of the gates will be lowered sufficiently to pick up the ejectors.

Figure 19:
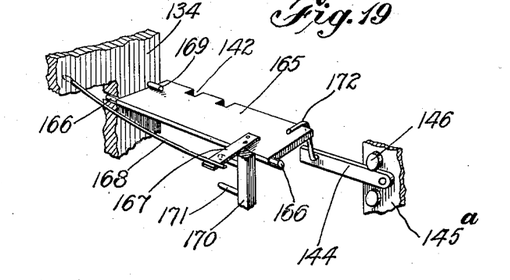
Fig. 19 is a perspective view showing an alternative construction for the gates and ejecting fingers.
Figure 20:
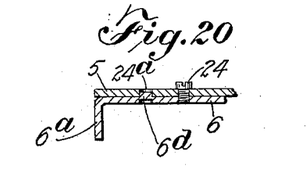
Fig. 20 is a partial longitudinal section through a carrier on line H—H of Fig. 14.

In Fig. 19 I have shown an alternative construction for the gates and ejectors. In this view the gates are marked 165 and have ears 166 by means of which they are pivoted in the gate housing side pieces 134. The rear edge in which the wards 142 are cut is held up by means of a spring 168, which is mounted in one of the sides 134. This spring acts against an arm 167 which is riveted to the gate and holds the gate up against one of the pins 169. This construction permits of running the machine at a higher speed; the gate being much narrower and lighter there is less trouble from inertia of these parts and the springs act quicker than gravity.

From the construction of the carriers the ejecting fingers are necessarily lower than the edges of the gates which are warded. In Fig. 19 I have shown a hook connection 172 extending upward from ejector 144 to support the ejector. A bar 170 having pins 171 performs the same function for this construction as the bar 162 and the pins 162ª do for the construction previously explained. With this construction the gate housing does not need to be oscillated.

I have shown a magazine of type channels 163 which register with the type shelves and into which the type may be delivered.

Figure 22:
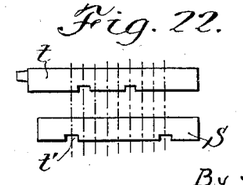
Fig. 22 is a side elevation of a type and a space with indicated positions of the distributing nicks.

In setting type little attention is given to the end up the spaces are put in the line and hence a number of distributing machines have two channels or compartments in which to eject each space. I avoid this and distribute my spaces in the same channel no matter which end up they are in the line of dead matter. I do this by making the distributing nicks of the type so that the spaces may be nicked symmetrically. Fig. 22 shows a space $s$ so nicked. It will be noticed that the position for the middle nick would be central on a blank type or space, and that the spaces may be nicked so that they will call into action the same set of feelers no matter which end up they are set up in the line. Power to drive the machine is applied to a sheave wheel 164 which is on the right hand end of the power shaft.

I claim, for use in a type distributing machine:

1. The combination of the following elements, to-wit: a plurality of type carriers; a type gripper mounted on each of said carriers; means for advancing said carriers to a loading position; means for raising the gripper to receive a type of maximum size type body; means for feeding type to the carriers when in loading position and means for retarding the movement of said grippers against a type.

2. The combination of the following elements, to-wit: a plurality of type carriers; a spring-seated type gripper having a projecting portion, mounted in each of said carriers; a swinging arm mounted adjacent to said carriers—the free end of said arm being adapted to intercept the projecting portion of said gripper; means for moving said arm into the path of said grippers just before they reach the loading position, to raise said grippers to receive a type of maximum size type body; means for feeding a type into said carriers when they are in loading position; means for withdrawing the arm—the pivotal point of the arm being located in such a position and the contact of the arm being great enough to give said gripper a slow movement against the type before said arm entirely clears said gripper.

3. The combination of the following elements, to-wit: a plurality of type carriers; a type discharging member mounted in each of said carriers; means for advancing said carriers to a loading position; means for feeding a type into said carriers when they are in loading position; means for operating said discharging member slightly beyond its carrier when said carrier is in discharging position, to expel the type from the carrier and means for positively returning the projecting end of said discharging member wholly within the carrier while said carrier is in its discharging position.

4. The combination of the following elements, to-wit: a channel shaped type carrier; a discharging plunger which is adapted to slide freely between the side walls of said carrier; a type gripper; a bridge piece mounted in the side walls of said carrier which has a free spring end bearing against said discharging plunger and to which said gripper is secured; a distributing index comprising a plurality of movable parts which are mounted in the side walls of said carrier; an ejecting mechanism which is adapted to act upon said discharging plunger and intermediate connections between said distributing index and said ejecting mechanism, by means of which the latter is called into action to move said discharging plunger.

5. A plurality of type carriers each provided with an ejecting plunger; a distributing index which is composed of a plurality of movable sliding pins mounted in said carrier, in combination with a plurality of ejecting fingers which are mounted on a common bar; a plurality of rocking gates mounted in proximity to said distributing index pins, each of which is adapted to support the free end of one of said ejecting fingers and normally to hold it in line with one of the discharging plungers of the carriers—said gates being warded to correspond to the distributing nicks of the type; means for projecting said index pins to rock said gates when the wards of the gates do not correspond to the projected pins.

6. A channel-shaped type carrier; a type ejector inclosed between the side walls of said carrier; a type gripping member mounted on said carrier; in combination with means outside of said carrier for positively pushing one end of said type ejector slightly beyond said carrier and means for positively returning the end of said ejector within said carrier.

7. A type carrying mechanism comprising an endless chain—said chain being formed of a plurality of channel shaped sheet metal links pivoted together; individual type carriers secured to the links of said chain—said type carrier being formed of sheet-metal bent into channel shape; interlocking dowels between said carriers and said links formed integral with one of said parts, whereby the said type carriers are accurately located on said chain links.

8. The combination of the following elements, to-wit: a channel-shaped type carrier; a type gripper mounted on said carrier and adapted to clamp a type against one of the walls of said carrier; a type discharging member mounted in said carrier; an ejecting mechanism for actuating said discharging member to expel a type from said carrier—said gripping member being adapted to act as a retaining pawl to prevent the type being drawn back into the carrier on the return movement of said discharging member.

9. A type carrier having a type gripping spring and a type discharging plunger—said gripping spring being adapted to act against said plunger—the pushing end of said discharging plunger being broad enough to push a type of a maximum size type body and being partially cut away to receive and permit said type gripping spring to hold a type of minimum type body size.

10. A plurality of type carriers mounted on an endless chain; a plurality of distributing index pins mounted in each of said carriers and adapted to move transversely to the movement of said chain; means for advancing said carriers step by step to a loading position, in combination with means for driving certain of said index pins when in loading position and an idle roll mounted adjacent to said carriers for returning any of the index pins which may have been driven, before they again reach the loading position.

11. A plurality of type carriers each provided with a distributing index mechanism which may be set to correspond to the distributing nicks of a type in combination with an index setting mechanism and a primary nick-indicating device which is adapted to feel the nicks of a type—said index setting mechanism taking its reading from said primary nick-indicating device.

12. A primary nick-indicating device which is adapted to feel the distributing nicks of a type—said nick-indicating device comprising a plurality of feeler levers and a corresponding plurality of blocking pieces which are controlled by said feeler levers, in combination with a second combination-reading device which is adapted to take its reading from the settings of said blocking pieces to effect the proper distribution of that type.

13. A primary nick-indicating device comprising a plurality of multiplying levers—the short ends of which are adapted to register with and to feel the distributing nicks of a type—and a corresponding plurality of blocking pieces which are controlled by the long ends of said feeler levers.

14. A nick-indicating device comprising a plurality of feeler levers, in combination with means for bringing a type within reach of said feeler levers; means for forcing said levers yieldingly against said type in order to read the distributing nicks thereof; a corresponding series of blocking pieces—one controlled by each feeler lever; means for taking a reading of the blocking pieces when the feelers are against the type—the pressure of the feeler levers against the type being released before said type is moved.

15. A plurality of type carriers each having a distributing index comprising a series of movable parts, in combination with a corresponding series of setting pieces; means for moving the carriers successively to register with said setting pieces and means for reading the distributing nicks of a type and causing the corresponding setting pieces to drive the corresponding movable pieces of the distributing index.

16. A plurality of type carriers each having a distributing index comprising a series of friction-held pins; a series of interponents each of which is adapted to drive a corresponding pin of a distributing index, in combination with means for advancing the carriers successively so that their index pins will register with said interponents; means for reading the distributing nicks of a type to call into action corresponding interponents; to set pins of the distributing index of the carrier which is opposite at that time—whereby the type which is read has pins set in the distributing index corresponding to the distributing nicks of said type and means for loading said type into the selected carrier in which the pins are set.

17. The combination of the following elements, to-wit: a plurality of type carriers each provided with a series of distributing index pins; means for advancing said carriers to a common loading and setting position; a series of interponents which may be made to register with the index pins of any carrier when said carrier is in loading position; a corresponding series of levers, each of which is adapted to control an interponent to make it register with an index pin; a series of type feelers; a corresponding series of blocking pieces controlled by said feelers; means for yieldingly seating said feelers against a type to set said blocking pieces; means for yieldingly seating one end of said levers against said blocking pieces to control the positions of said interponents according to the distributing nicks of said type; means for moving the interponents toward a carrier—whereby any of the interponents which are permitted to act by the blocking pieces will drive corresponding index pins of the carrier which is at the loading position and means for loading the type which has been read, into the carrier in which the pins have been set.

18. An adjustable bridge under which the line of type to be distributed must pass in combination with a sliding line hook which is mounted in said bridge; means for controlling the movement of said line hook to regulate the advance movement of the line—said controlling means having a contact connection only with said line hook—whereby the line hook and bridge piece may be adjusted independent of said controlling means.

19. Means for slowly feeding or advancing a line of type, in combination with a cut-off bar which is yieldingly seated against the foremost type of the line—said cut-off bar having a parallel ruler movement mounting.

20. A bridge under which the line of type to be distributed must pass, means for slowly feeding or advancing said line; in combination with a cut-off bar mounted on said bridge which is adapted to cut off the end type of said line and means for adjusting said bridge for various body sizes, whereby the cut-off bar is simultaneously adjusted by the adjustment of the bridge.

21. A type transfer mechanism comprising a reciprocating slide, an adjustable type pusher mounted on said slide under which the type to be transferred is placed; and a pair of friction-held plates or slides between which and said type pusher the type is gripped while being transferred—said friction-held slides being returned or set by the return movement of said transfer slide.

22. An adjustable bridge under which the line of type to be distributed must pass, in combination with a spring-seated cut-off bar which is mounted on said bridge; a reciprocating slide; an adjustable type pusher mounted on said slide which is adapted to pick up and withdraw said cut-off bar from the line of type.

23. The combination of the following elements, to wit: a plurality of type feelers; means for cutting off a type from a line; a type knocker which is adapted to cause the distributing nicks of a type to line with said feelers; a type transfer mechanism for carrying a type; means for seating said feelers yieldingly against said type; a type carrier and a loading plunger which is adapted to load said type into said carrier—said loading plunger performing the double function of loading said type into said carrier and supporting said type while being acted on by said knocker.

24. A plurality of type carriers each of which has a distributing index mechanism which may be set to regulate the discharge of the type from the carrier at the proper place, a plurality of feelers and intermediate mechanism by means of which the distributing index is set to correspond to the distributing nicks of the type—said feelers being in such position that a type which is symmetrically nicked with reference to its center will effect the same setting of the distributing index mechanism no matter whether said type is right end up or "turned"—whereby certain characters or blank type may be discharged in their proper channels whether turned or right end up.

In testimony whereof I affix my signature in presence of two witnesses.

WM. M. KELLY.

Witnesses:
  ELMO DUFF,
  FRANK B. SNELL.

---

Copies of this patent may be obtained for five cents each, by addressing the "Commissioner of Patents, Washington, D. C."